(12) United States Patent
Cooper

(10) Patent No.: US 11,549,490 B2
(45) Date of Patent: *Jan. 10, 2023

(54) REINFORCEMENT ASSEMBLY FOR WIND TURBINE TOWER

(71) Applicant: General Electric Company, Schenectady, NY (US)

(72) Inventor: Gregory Edward Cooper, Greenfield Center, NY (US)

(73) Assignee: General Electric Company, Schenectady, NY (US)

(*) Notice: Subject to any disclaimer, the term of this patent is extended or adjusted under 35 U.S.C. 154(b) by 1086 days.

This patent is subject to a terminal disclaimer.

(21) Appl. No.: 16/197,840

(22) Filed: Nov. 21, 2018

(65) Prior Publication Data

US 2019/0093635 A1 Mar. 28, 2019

Related U.S. Application Data

(62) Division of application No. 15/298,435, filed on Oct. 20, 2016, now Pat. No. 10,145,133.

(51) Int. Cl.
*F03D 13/20* (2016.01)
*F03D 80/50* (2016.01)
*E04G 23/02* (2006.01)
*E04H 12/08* (2006.01)

(52) U.S. Cl.
CPC .......... *F03D 13/20* (2016.05); *E04G 23/0218* (2013.01); *F03D 80/50* (2016.05); *E04H 12/08* (2013.01); *F05B 2230/80* (2013.01); *F05B 2240/912* (2013.01); *Y02E 10/728* (2013.01); *Y02P 70/50* (2015.11)

(58) Field of Classification Search
CPC .......... F03D 13/20; F03B 80/50; Y02P 70/50; F05B 2230/91; F05B 2240/91; Y02E 10/728

See application file for complete search history.

(56) References Cited

U.S. PATENT DOCUMENTS

| | | | |
|---|---|---|---|
| 6,806,212 B2 | 10/2004 | Fyfe | |
| 8,245,558 B2 | 8/2012 | Barr | |
| 10,145,133 B2* | 12/2018 | Cooper | .................. F03D 13/20 |
| 2005/0166521 A1 | 8/2005 | Silber | |
| 2008/0236073 A1 | 10/2008 | Bagepalli et al. | |
| 2010/0294016 A1* | 11/2010 | Barr | ......................... B21D 1/08 |
| | | | 72/429 |
| 2011/0133475 A1* | 6/2011 | Zheng | .................... E04H 12/10 |
| | | | 290/55 |

(Continued)

*Primary Examiner* — Sean Gugger
(74) *Attorney, Agent, or Firm* — Dority & Manning, P.A.

(57) ABSTRACT

The present disclosure is directed to an internal reinforcement assembly for a tower of a wind turbine. The reinforcement assembly includes a plurality of reinforcing rod members spaced circumferentially about the tower. Each of the plurality of reinforcing rod members includes a first end and a second end. The reinforcement assembly also includes an adjustable mounting component configured with each of the second ends of the plurality of reinforcing rod members. As such, the adjustable mounting components are mounted to an interior wall of the tower at a location to be reinforced. Thus, the reinforcing rod members interact with the tower to reinforce the tower at the location to be reinforced.

13 Claims, 11 Drawing Sheets

(56) References Cited

U.S. PATENT DOCUMENTS

| | | |
|---|---|---|
| 2011/0210233 A1* | 9/2011 | Fang ................ F03D 13/20 |
| | | 248/673 |
| 2015/0069759 A1 | 3/2015 | Aranovich |
| 2015/0314994 A1 | 11/2015 | Meyer |
| 2015/0316035 A1 | 11/2015 | Doucet |
| 2017/0101823 A1 | 4/2017 | Yenser |
| 2017/0175715 A1 | 6/2017 | Karesangannavar |

* cited by examiner

REINFORCEMENT ASSEMBLY FOR WIND TURBINE TOWER

RELATED APPLICATIONS

The present disclosure is a division of U.S. application Ser. No. 15/298,435 filed on Oct. 20, 2016, which is incorporated herein by reference in its entirety.

FIELD

The present disclosure relates generally to wind turbines, and more particularly to reinforcement assemblies for wind turbine towers.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the turbine blades. However, by increasing the length of the rotor blades, the various other components of the wind turbine are often subjected to increased loads. For example, by increasing the rotor diameter, a significantly larger load is typically transmitted through the tower. As such, it is often necessary to completely replace the existing tower to accommodate the increased loads associated with the longer rotor blades.

In addition, various rotor blades are manufactured with a pre-bend or a tendency to bend at a certain location. Such rotor blades, however, may be more susceptible to striking the tower of the wind turbine, particularly when they have been lengthened. A tower strike can significantly damage a turbine blade and the tower. For example, in certain instances, a turbine blade may strike the tower thereby causing a dent that must be repaired. Damage to the tower can also be caused by a variety of other factors in addition to blade tower strikes, including, for example, foreign objects striking the tower. Typical methods for repairing tower damage involve shutting down the wind turbine and repairing and/or replacing the damaged tower section or, where applicable, the entire tower. Such methods, however, require significant labor, costs, and turbine down time, thereby resulting in a loss of annual energy production (AEP).

Accordingly, there is a need for an improved system and method for reinforcing wind turbine towers that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to an internal reinforcement assembly for a tower of a wind turbine. The reinforcement assembly includes a plurality of reinforcing rod members spaced circumferentially about the tower. Each of the plurality of reinforcing rod members includes a first end and a second end. The reinforcement assembly also includes an adjustable mounting component configured with each of the second ends of the plurality of reinforcing rod members. As such, the adjustable mounting components are mounted to an interior wall of the tower at a location to be reinforced. Thus, the reinforcing rod members interact with the tower to reinforce the tower at the location to be reinforced, e.g. which may contain a dent or some other form of damage and/or may be a location at which it is desired to provide additional reinforcement to accommodate increased tower loads.

In one embodiment, each of the first ends may extend radially from a connector node, e.g. a center connector node. In further embodiments, each of the first ends may also include one of the adjustable mounting components configured therewith. In such embodiments, the adjustable mounting components of the first ends may be configured for mounting to the connector node and/or the interior wall of the tower at the location to be reinforced.

In another embodiment, the reinforcement assembly may have a multi-level configuration that includes a plurality of first reinforcing rod members configured atop a plurality of second reinforcing rod members in a vertical plane. Thus, in certain embodiments, sets of the first and second reinforcing rod members may be coupled together via one or more support structures. In addition, sets of the first and second reinforcing rod members may be coupled to the connector node, i.e. via the same or different adjustable mounting components. As such, the first and second reinforcing rod members may be substantially parallel to each other or may be configured to intersect each other at the connector node.

In further embodiments, the reinforcement assembly may also include a plurality of third reinforcing rod members configured atop the plurality of first and second reinforcing rod members in the vertical place. In such embodiments, the first, second, and third reinforcing rod members may be coupled to the connector node, i.e. at the same or different adjustable mounting components. More specifically, the first reinforcing rod members may be in compression, whereas the second and third reinforcing rod members may be in tension when mounted to the interior wall of the tower.

In additional embodiments, the adjustable mounting components as described herein may include a jacking screw, a jacking foot, a bracket, a weld, a telescoping end, one or more fasteners, an eyelet screw, or any other suitable device configured to couple the reinforcing rod members to the interior wall of the tower.

In further embodiments, the reinforcing rod members may be formed of any suitable material and may have any suitable shape. For example, in certain embodiments, the reinforcing rod members may be formed from carbon steel, stainless steel, or any other suitable material for securing the location to be reinforced. Further, the reinforcing rod members may include any suitable cross-sectional shape, such as circular, oval, rectangular, square, or similar.

In another embodiment, the reinforcing assembly may further include a processor configured to perform one or more operations, including but not limited to mapping the dent, determining a buckling analysis of the dent, and determining a number and location for the plurality of reinforcing rod members to mount to the interior wall of the tower.

In another aspect, the present disclosure is directed to tower assembly for a wind turbine. The tower assembly includes at least one generally cylindrical tower section having an exterior wall and an interior wall defining a height and a thickness therebetween and at least one reinforcement assembly. The reinforcement assembly includes a plurality of reinforcing rod members spaced circumferentially about the tower. Each of the plurality of reinforcing rod members includes a first end and a second end. Further, the reinforcement assembly also includes an adjustable mounting component configured with each of the second ends of the plurality of reinforcing rod members. As such, the adjustable mounting components are mounted to an interior wall of the tower at a location to be reinforced. Thus, the reinforcing rod members interact with the tower to reinforce the tower at the location to be reinforced, e.g. which may contain a dent or some other form of damage and/or may be a location at which it is desired to provide additional reinforcement to accommodate increased tower loads. It should be further understood that the tower assembly may also include any of the additional features as described herein.

In yet another aspect, the present disclosure is directed to a method for reinforcing a tower of a wind turbine having at least one damaged location. The method includes mapping the damaged location. The method also includes performing, via at least one processor, a buckling analysis of the damaged location based on the mapping. Such method steps allow a user to better understand the damaged location, i.e. its shape, location, size, etc. Further, the method includes determining a number of reinforcing rod members to mount to an interior wall of the tower based on the buckling analysis. In addition, the method includes determining a mounting location on the interior wall of the tower for each of the reinforcing rod members based on the buckling analysis. Thus, the method further includes mounting the reinforcing rod members to the mounting locations to reinforce the damaged location.

In one embodiment, the step of mapping the damaged location may include generating a computer model of the damaged location using at least one of point cloud technology or mechanical measurements.

In another embodiment, the step of performing the buckling analysis of the damaged location may include performing a finite element analysis (FEA) of the damaged location, developing one or more transfer functions from the FEA, and building a software analysis tool based on the one or more transfer functions.

In further embodiments, the method may also include checking a load limit of the tower (e.g. for buckling and/or fatigue) after mounting the reinforcing rod members to the mounting locations to ensure that the reinforcement assembly is adequately enforcing the damaged location of the tower.

In additional embodiments, the step of mounting the reinforcing rod members to the mounting locations may be completed uptower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
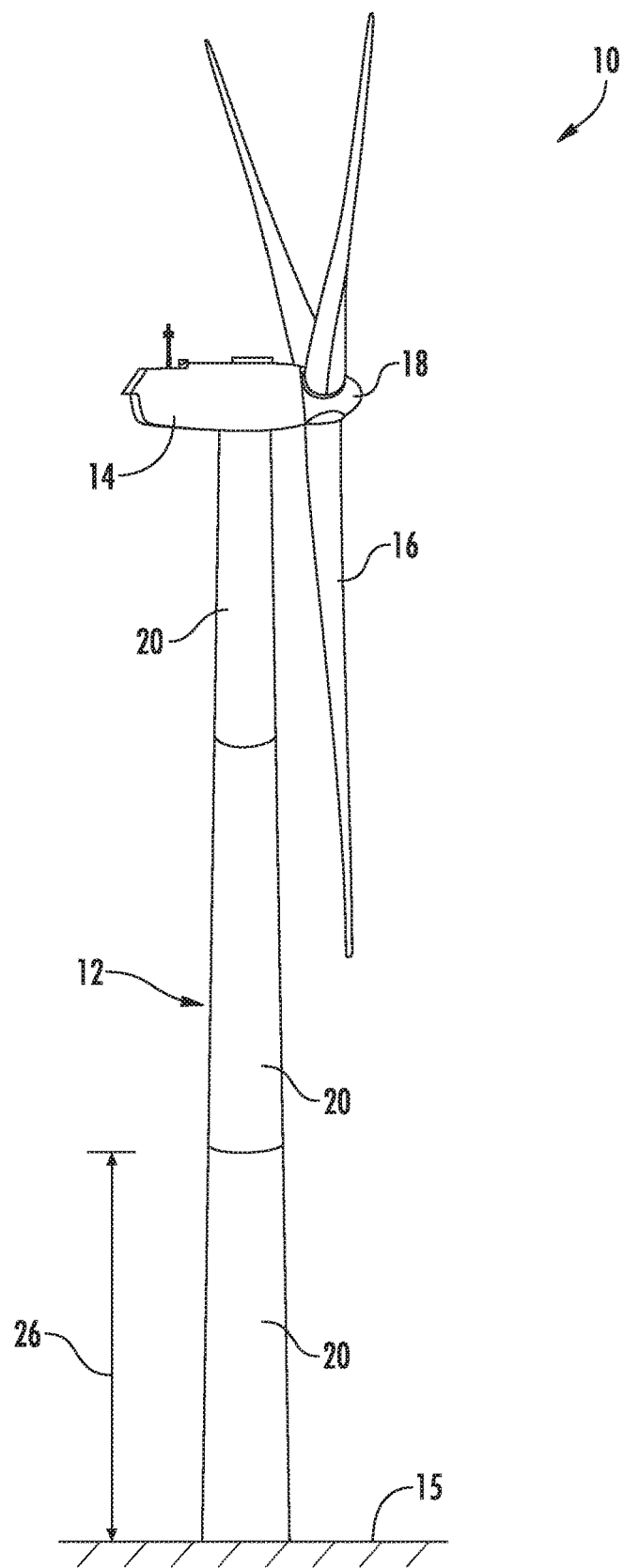
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates one embodiment of a wind turbine 10 according to the present disclosure. As shown, the wind turbine 10 includes a tower 12 extending from a support surface. Further, as shown, the tower 12 includes a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

As further shown in FIG. 1, the tower 12 according to the present disclosure may be formed from a plurality of tower sections 20. It should also be understood that the tower 12 may constructed of a single tower section 20. As discussed below, each of the plurality of tower sections 20 may be disposed adjacent and coupled to another of the plurality of tower sections 20 to at least partially form the tower 12. In certain embodiments, the tower sections 20 may be formed from a suitable metal or metal alloy, such as carbon steel. Alternatively, however, the tower sections 20 may be formed from any suitable materials, such as, for example, various suitable composite materials. Further, as shown generally in the figures, in certain embodiments, the tower 12 may be a generally cylindrical tower 12. For example, the cross-sectional shape of the tower 12 may be generally circular or oval. Further, in some embodiments, the cross-sectional shape of the tower 12 may be generally polygonal, having a plurality of sides such that the polygonal cross-section approximates a generally circular or oval cross-section.

It should also be understood that the cross-sectional area of the tower section(s) 20 may remain constant or may taper through the height 26 of the tower section(s) 20 or portions thereof. For example, in some embodiments, the cross-sectional area of each of the tower sections 20 may decrease through the height 26 or a portion thereof. Further, it should be understood that the tower sections 20 comprising the tower 12 may all taper or may all have generally constant cross-sections, or one or more of the tower sections 20 may taper while other of the tower sections 20 may have generally constant cross-sections.

Referring now to FIGS. 2-9, various embodiments of a tower assembly 30 for the wind turbine tower 12 having an internal reinforcement assembly 32 configured therein according to the present disclosure are illustrated. The tower assembly 30 of the present disclosure is configured to reinforce an area of the tower 12 without having to replace the tower 12, such as when a portion of the tower is damaged or dented and/or when it is desired to add further reinforced to a portion of the tower (e.g., to allow the tower to accommodate increased loads). In addition, the tower assembly 30 is configured to increase the tower load carting capability, which is desirable when the wind turbine 10 is uprated and loads on the tower 12 increase. As such, this enables the tower 12 to be re-used instead of being replaced. As shown, the tower assembly 30 includes at least one generally cylindrical tower section 20 having an exterior wall 22 and an interior wall 24 defining a height 26 (FIG. 1) and a thickness 28 therebetween. Further, as shown, the tower assembly 30 includes a plurality of reinforcing rod members 34 spaced circumferentially about the tower 12.

Figure 2:
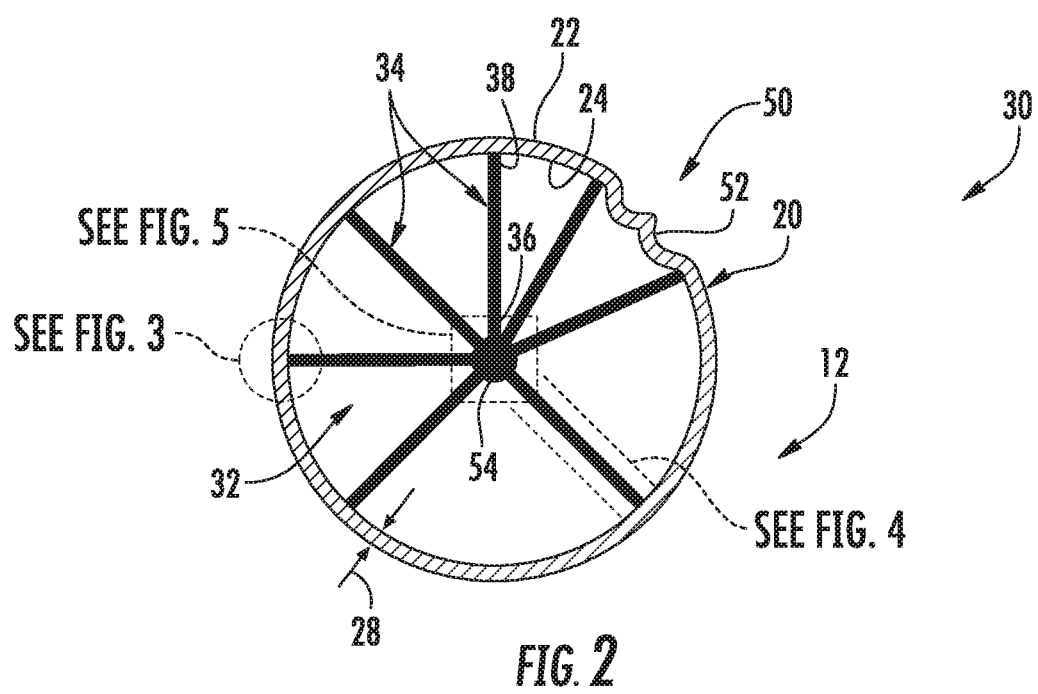
FIG. 2 illustrates a top cross-sectional view of one embodiment of a reinforcement assembly according to the present disclosure.
Figure 3:
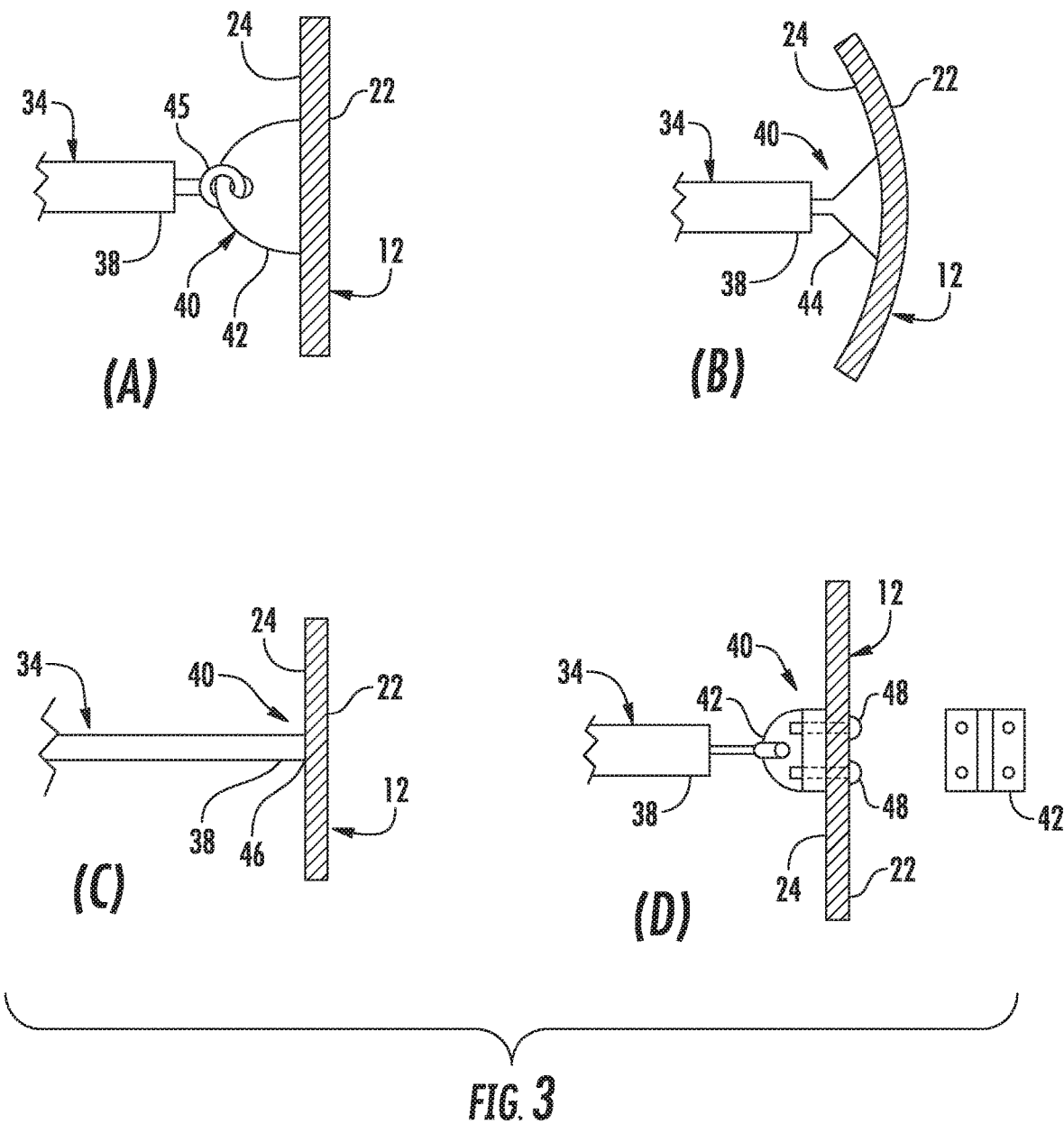
FIG. 3 illustrates side elevation views of various embodiments of adjustable mounting components of a reinforcement assembly according to the present disclosure.
Figure 4:
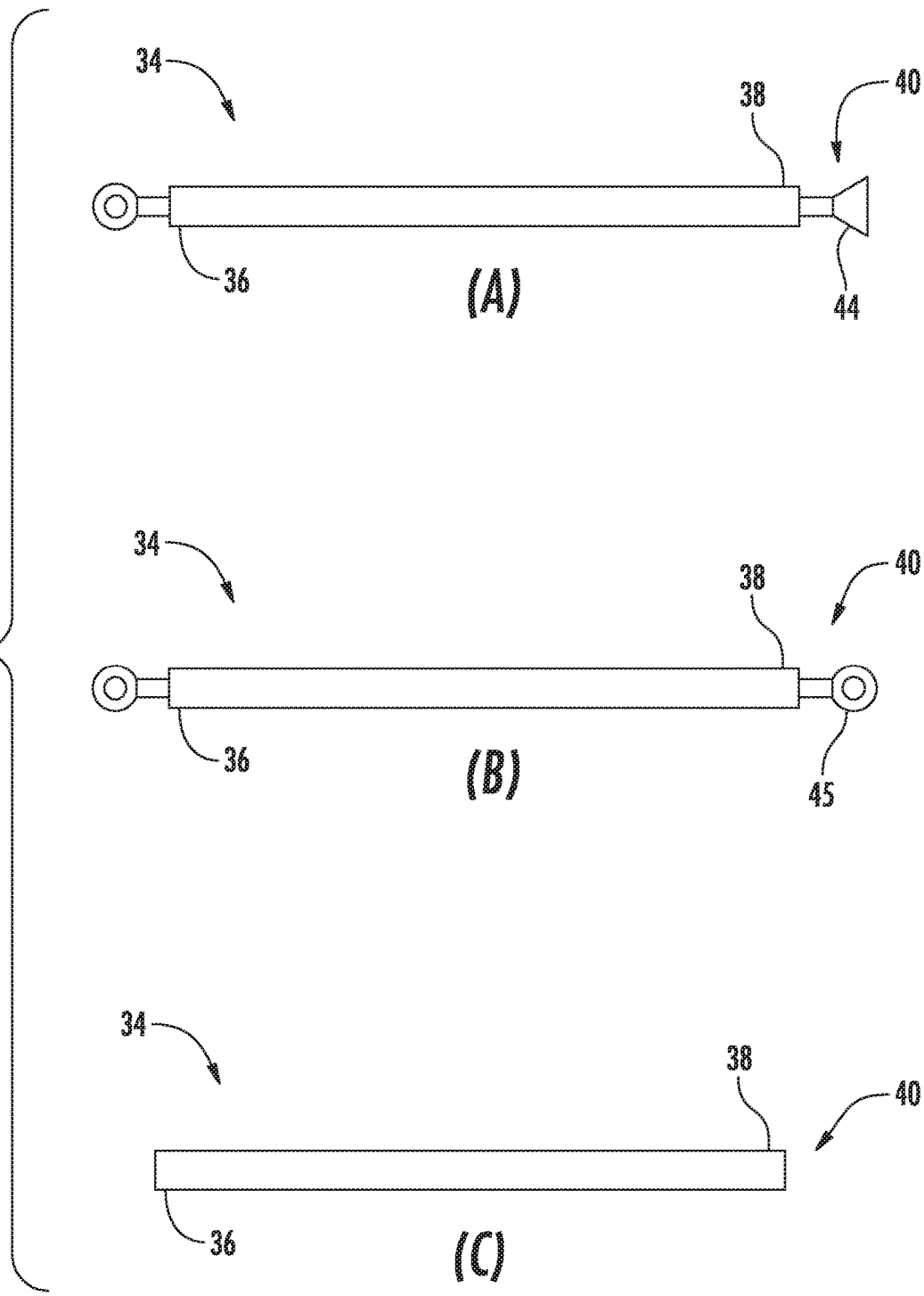
FIG. 4 illustrates perspective views of various embodiments of reinforcing rod members of a reinforcement assembly according to the present disclosure.
Figure 8:
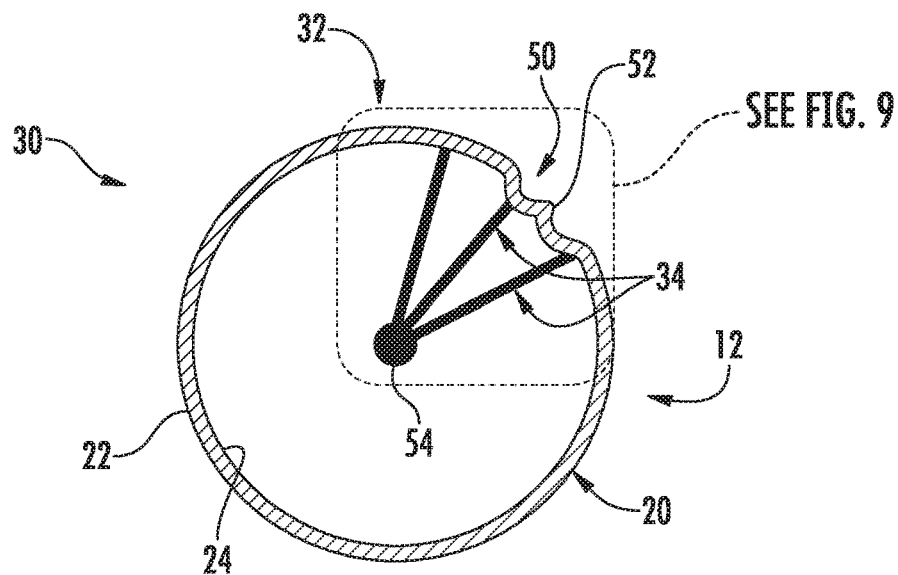
FIG. 8 illustrates a top cross-sectional view of another embodiment of a reinforcement assembly according to the present disclosure.
Figure 10:
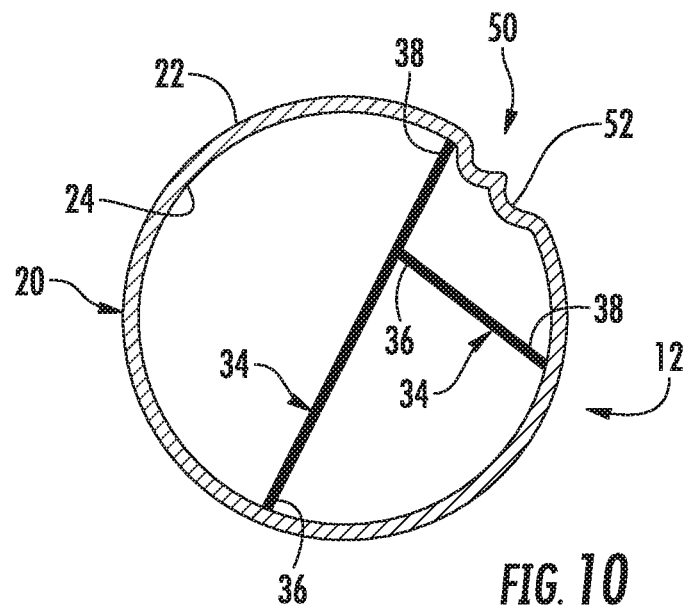
FIG. 10 illustrates a top cross-sectional view of yet another embodiment of a reinforcement assembly according to the present disclosure.
Figure 11:
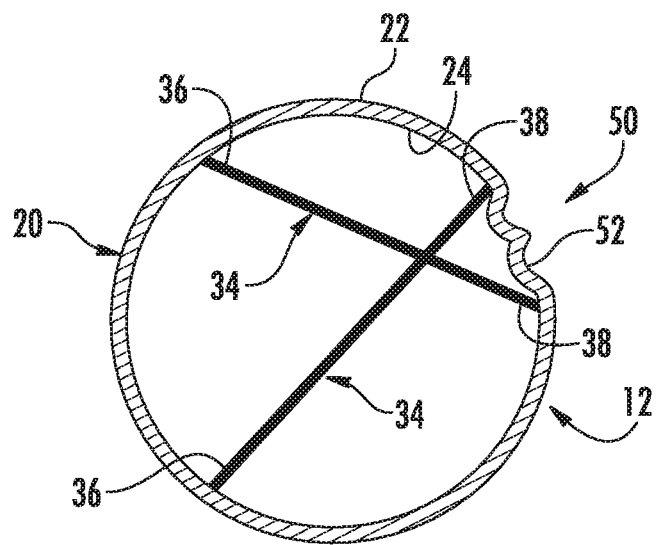
FIG. 11 illustrates a top cross-sectional view of still another embodiment of a reinforcement assembly according to the present disclosure.

Referring particularly to FIGS. 3 and 4, each of the reinforcing rod members 34 includes a first end 36 and a second end 38. Thus, in certain embodiments, as shown in FIGS. 2 and 8, each of the first ends 36 may extend radially from a connector node 54, with the second ends 38 secured to the interior wall 24 of the tower 12. In alternative embodiments, as shown in FIG. 10, a first reinforcing rod members 34 may extend generally across the diameter of the tower 12 between its first and second ends 36, 38, whereas a first end 36 of a second reinforcing rod member 34 may be coupled to and extend from the first reinforcing rod member 34 to the interior wall 24 of the tower 12. In still another embodiment, as shown in FIG. 11, the first and second ends 36, 38 of the reinforcing rod members 34 may extend from a first location on the interior wall 24 of the tower 24 to a second location on the interior wall 24 thereof, i.e. generally across the diameter of the tower 12.

In further embodiments, the reinforcing rod members 34 may be formed of any suitable material and may have any suitable shape. For example, in certain embodiments, the reinforcing rod members 34 may be formed from, for example, a metal or metal alloy, such as carbon steel or stainless steel. Alternatively, the reinforcing rod members 34 may be formed from any suitable material such as, for example, fiberglass, carbon glass, polyester, or a suitable composite material. In some embodiments, the reinforcing rod members 34 and the tower section 20 may be formed from the same material, such as carbon steel, such that the thermal expansion properties of the reinforcing rod members 34 and the tower section 20 are generally similar or identical. Further, the reinforcing rod members 34 may include any suitable cross-sectional shape, such as circular, oval, rectangular, square, or similar.

Figure 5:
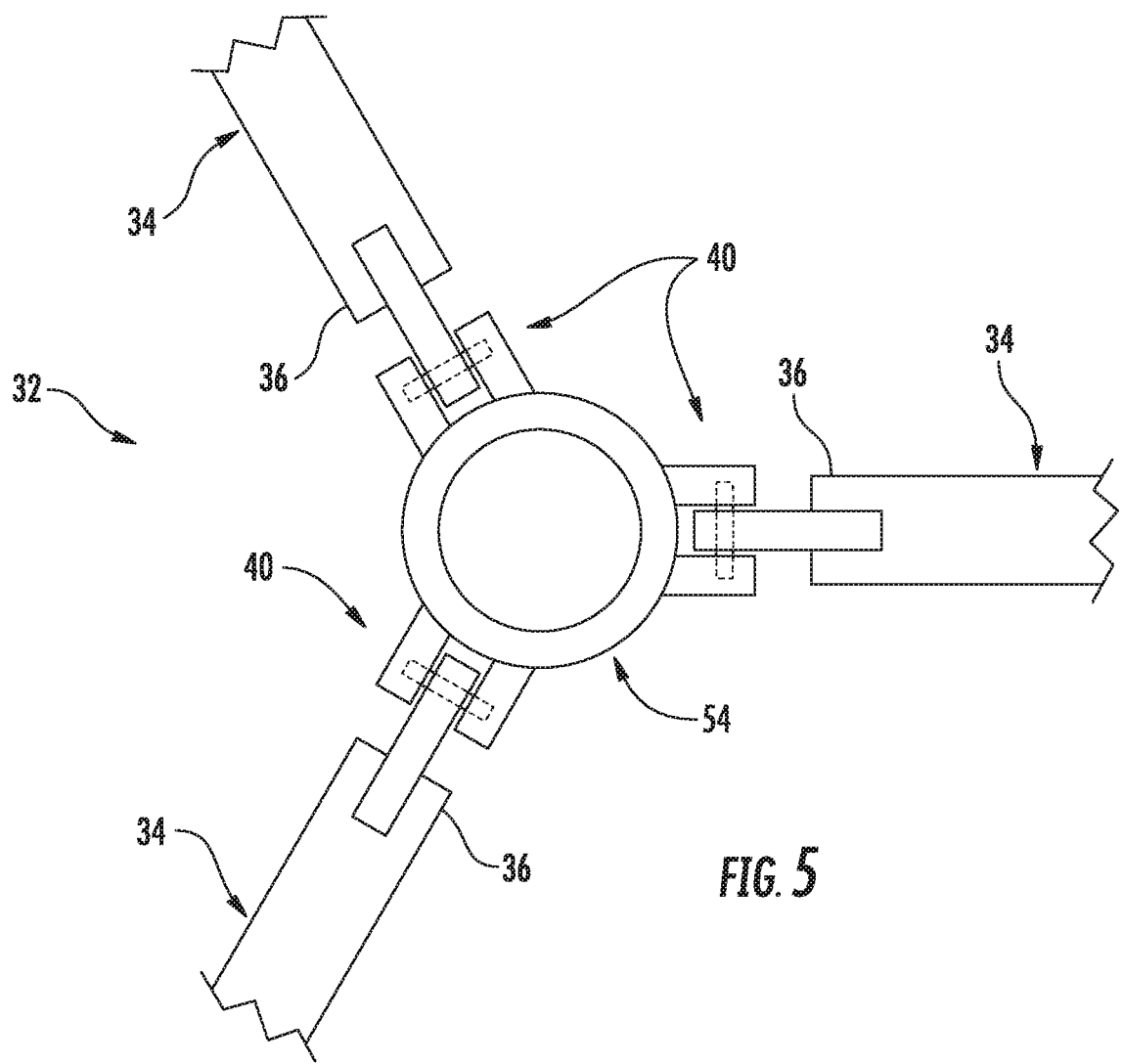
FIG. 5 illustrates a top view of one embodiment of a connector node of a reinforcement assembly according to the present disclosure.

Referring now to FIGS. 3, 4, 6, 7, and 9, the reinforcement assembly 32 also includes an adjustable mounting component 40 configured with either or both of the first and second ends 36, 38 of the reinforcing rod members 34. In addition, as shown in FIG. 5, a top view of one embodiment of the connector node 54 is illustrated, particularly illustrating each of the reinforcing rod members 34 being coupled to the connector node 54 via one of the adjustable mounting components 40. More specifically, in some embodiments, the reinforcing rod members 34 may be welded, glued, fastened with a suitable mechanical fastener, or otherwise directly mounted to the interior wall 24 of the tower 12, the connector node 54, and/or to each other via the adjustable mounting components 40. For example, as shown in FIG. 3, the adjustable mounting components 40 as described herein may include a jacking screw or foot 44 (FIG. 3(B)), one or more brackets 42 (FIGS. 3(A) and 3(D)), a direct weld 46 (FIGS. 3(C) and 4(C)), an eyelet screw 45 (FIGS. 3(A), 3(D), and 4(B)), one or more fasteners 48 (FIG. 3(D)), a telescoping end, or any other suitable device configured to couple the reinforcing rod members 34 to the interior wall 24 of the tower 12.

More specifically, as shown in FIG. 3(A), the adjustable mounting component 40 corresponds to an eyelet screw 45 coupled within a bore hole of a bracket 42 that is mounted to the interior wall 24 of the tower 12. The bracket 42 may be secured to the tower interior wall 24 using any suitable means such as welding, glue, and/or one or more mechanical fasteners. Further, as shown in FIG. 3(B), the adjustable mounting component 40 may correspond to a jacking foot 44. In such embodiments, a jacking foot generally refers to a mechanical device used to apply a force. Further, the jacking foot 44 may employ a screw thread for applying such force and/or hydraulic power. Moreover, as shown in FIG. 3(C), the adjustable mounting component 40 may correspond to a direct weld 46. In addition, as shown in FIG. 3(D), the adjustable mounting component 40 may correspond to a plurality of brackets 42 and/or fasteners 48. For example, as shown, at least one bracket 42 may be secured to the tower interior wall 24 using one or more mechanical fasteners 48 configured through bore holes thereof. Further, as shown, an eyelet screw 45 configured with the second end 38 of the reinforcing rod member 34 may be coupled within a bore hole of the bracket 42. In yet another embodiment, the adjustable mounting component 40 may be a telescoping end, which generally refers to an end that describes the movement of one part sliding out from another, which lengthens the object from its rest state.

Figure 6:
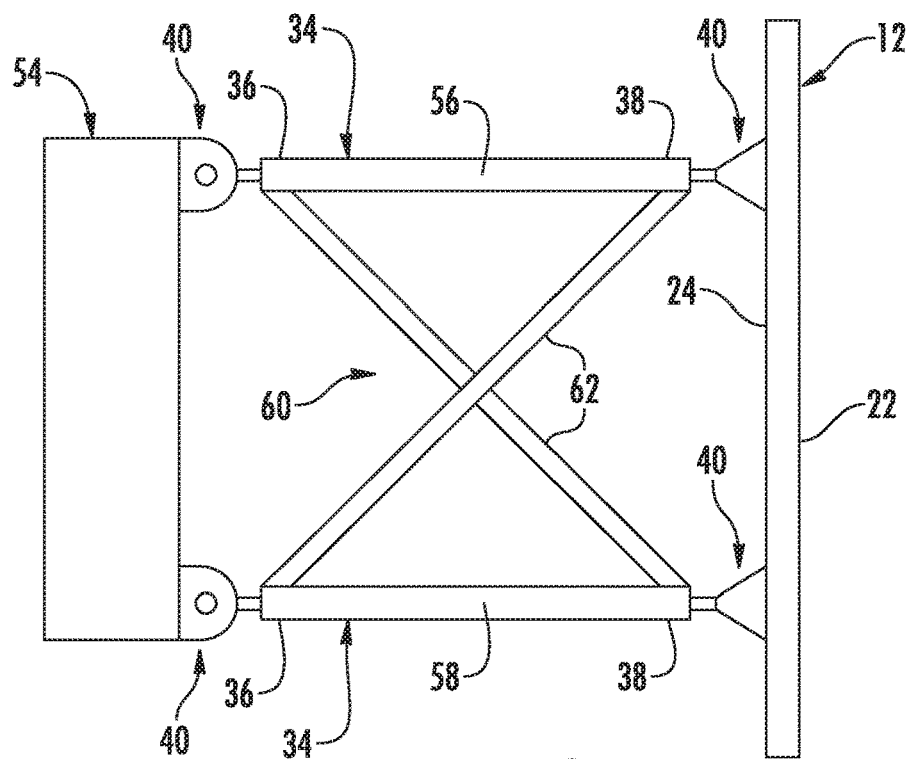
FIG. 6 illustrates a side elevation view of one embodiment of a multi-level configuration of a reinforcement assembly according to the present disclosure.
Figure 7:
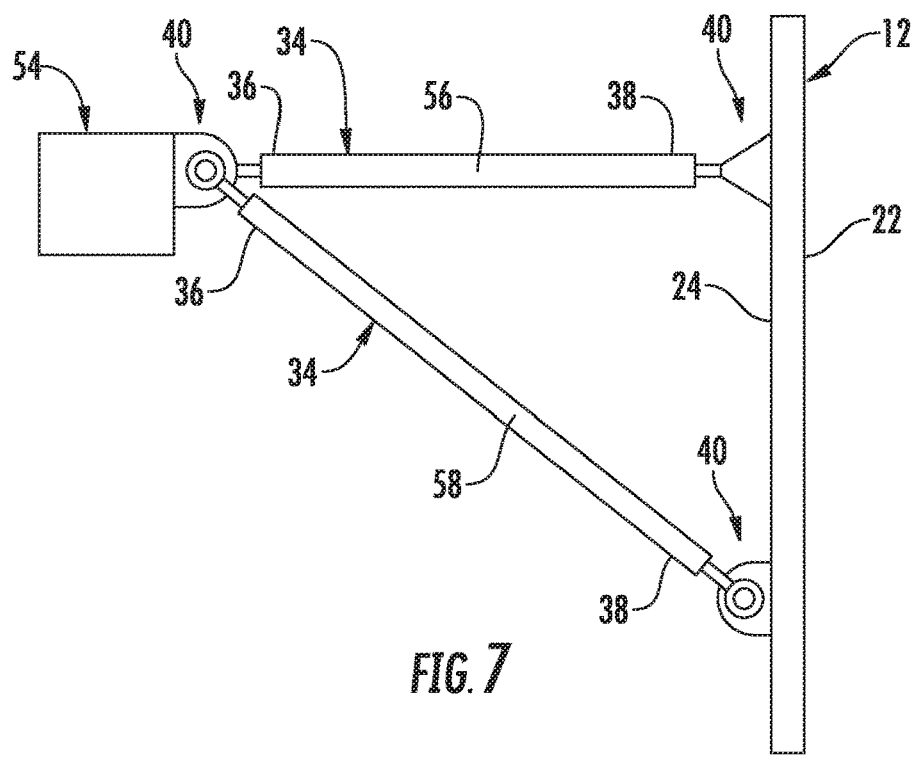
FIG. 7 illustrates a side elevation view of another embodiment of a multi-level configuration of a reinforcement assembly according to the present disclosure.
Figure 9:
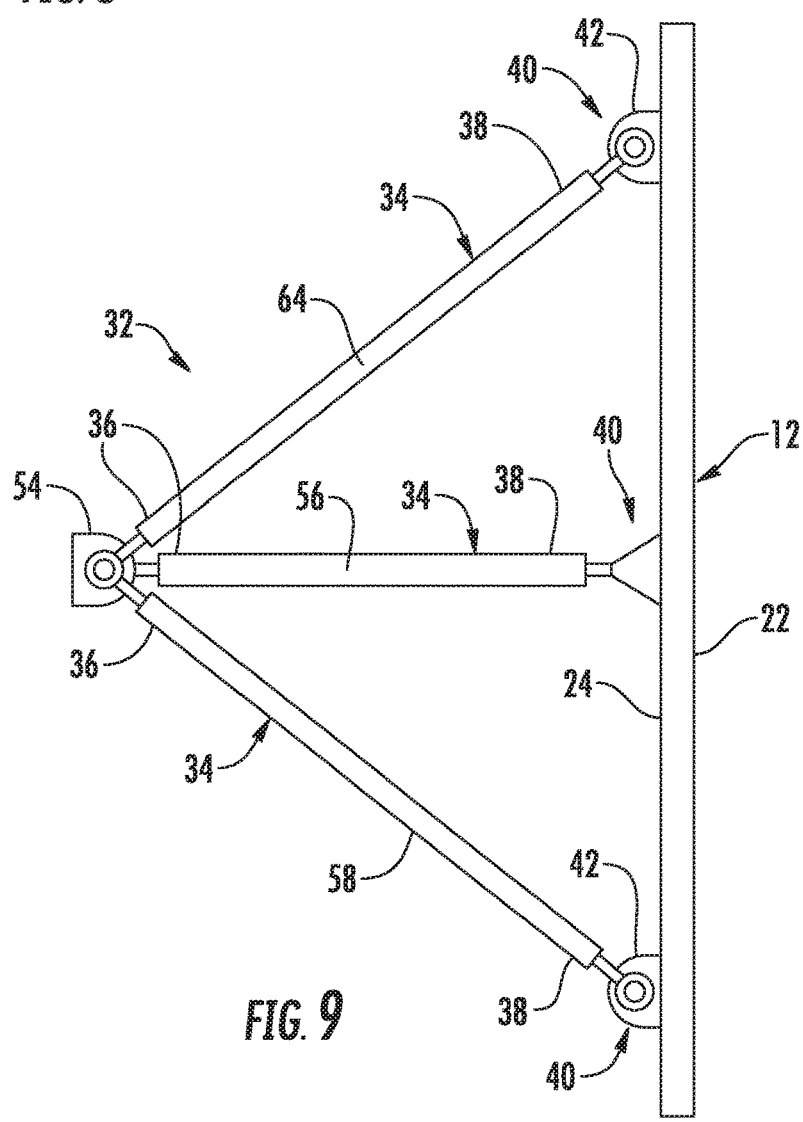
FIG. 9 illustrates a side elevation view of yet another embodiment of a multi-level configuration of a reinforcement assembly according to the present disclosure.

Referring now to FIGS. 6, 7, and 9, side elevation views of various embodiments of the reinforcement assembly 32 of the present disclosure are illustrated. As shown, the reinforcement assembly 32 may have a multi-level configuration, wherein the reinforcing rod members 34 extend generally vertically or may extend generally diagonally at any suitable angle. More specifically, as shown, the reinforcement assembly 32 includes a plurality of first reinforcing rod members 56 configured atop a plurality of second reinforcing rod members 58 in a vertical plane. In certain embodiments, as shown, a truss or a plurality of trusses may be mounted to the reinforcing rod members 34, and may extend between the reinforcing rod members 34, as required or desired to further reinforce the reinforcing rod members 34 and the tower 12. For example, as shown in FIG. 6, sets of the first and second reinforcing rod members 56, 58 may be coupled together via a support structure 60. More specifically, as shown, the support structure 60 may include one or more connecting members 62 arranged together to prevent sagging of the reinforcement assembly 32. Thus, as shown in the illustrated embodiment, the first and second reinforcing rod members 56, 58 may be substantially parallel to each other. In additional embodiments, sets of the first and second reinforcing rod members 56, 58 may be coupled to the connector node 54, i.e. via the same or different mounting components 40. For example, as shown in FIG. 6, the first and second reinforcing rod members 56, 58 are connected to different mounting components 40 of the connector node 54. Alternatively, as shown in FIG. 7, the first and second reinforcing rod members 56, 58 are connected to the same mounting component 40 of the connector node 54. Thus, in such embodiments, the first and second reinforcing rod members 56, 58 may be configured to intersect each other at the connector node 54 (i.e. rather than being parallel to each other).

Referring now to FIGS. 8 and 9, the reinforcement assembly 32 may have a localized configuration, i.e. which does not extend across the entire diameter of the tower but it local to the location to be reinforced 50. More specifically, as shown, the reinforcement assembly 32 may also include one or more third reinforcing rod members 64 configured atop the sets of first and second reinforcing rod members 56, 58 in the vertical place. In such embodiments, the first, second, and third reinforcing rod members 56, 58, 64 may be coupled to the connector node 54, i.e. via the same or different mounting components 40. In such embodiments, the first reinforcing rod members 56 may be in compression, whereas the second and third reinforcing rod members 58, 64 may be in tension when mounted to the interior wall 24 of the tower 12.

Accordingly, the reinforcement assembly 32 of the present disclosure is configured to interact with the tower 12 to reinforce the tower 12 at one or more locations to be reinforced 50, e.g. containing a dent 52 and/or where loads may be higher. Further, as described herein, the location to be reinforced 50 may be a relatively weaker or vulnerable location on the tower 12 that may limit the loads that the tower 12 may be subjected to or may constitute a potential failure location. As such, the reinforcing rod members 34 may be configured to reduce potential structural failures of the tower 12. For example, the tower 12 may be particularly susceptible to a certain form of structural failure, such as, for example, buckling, fatigue, fracture, or any other potential structural failure. The reinforcing rod members 34 may be configured to reduce the potential for one or more of these forms of structural failure. For example, the reinforcing rod members 34 may be mounted to the tower 12 at various locations where it has been determined that the tower 12 is more likely to fail, and the reinforcing rod members 34 may thus reinforce the tower 12 at these locations. Additionally or alternatively, the reinforcing rod members 34 may be mounted to a specific tower section 20 or sections 20 of the tower 12 that has been determined is more likely than other tower sections 20 to fail, and the reinforcing rod members 34 may thus reinforce this tower section 20.

Figure 12:
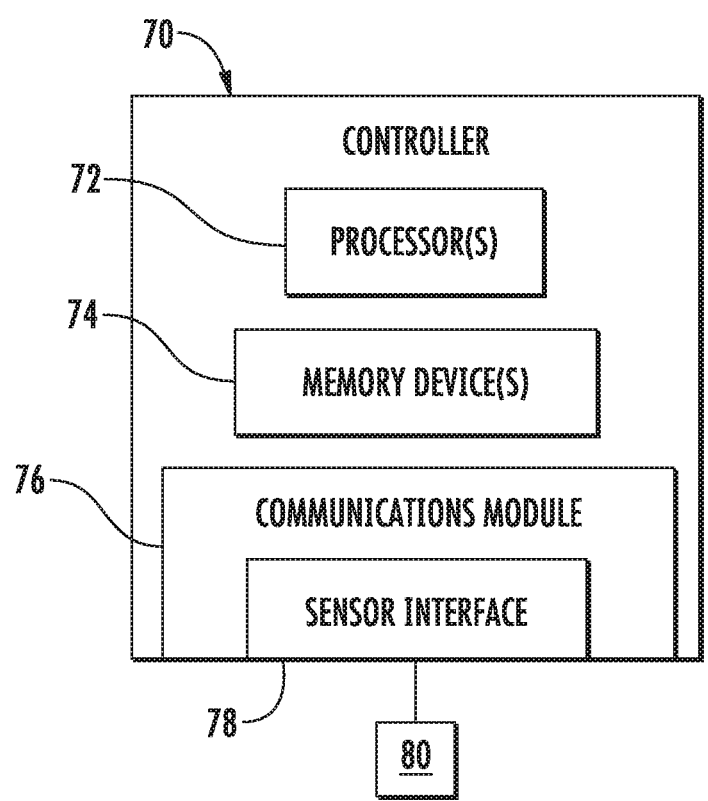
FIG. 12 illustrates a block diagram of one embodiment of suitable components that may be included in a controller of a reinforcement assembly according to the present disclosure.

Referring now to FIGS. 12-15, the reinforcing assembly 32 may also include a controller 70 configured to determine a number and/or location for each of the reinforcing rod members 34 to adequately support the location to be reinforced, e.g. containing the dent 52 or a location that requires additional reinforcement. For example, as shown in FIG. 12, there is illustrated a block diagram of one embodiment of suitable components that may be included in the controller 70 according to the present disclosure. As shown, the controller 70 may include one or more processor(s) 72 and associated memory device(s) 74 configured to perform a variety of computer-implemented functions (e.g., performing the methods, steps, calculations and the like and storing relevant data as disclosed herein). Additionally, the controller 70 may also include a communications module 76 to facilitate communications between the controller 70 and one or more sensors 80. Further, the communications module 76 may include a sensor interface 78 (e.g., one or more analog-to-digital converters) to permit signals transmitted from the sensor(s) 80 to be converted into signals that can be understood and processed by the processor(s) 72. It should be appreciated that the sensor(s) 80 may be communicatively coupled to the communications module 76 using any suitable means. For example, as shown in FIG. 12, the sensors 80 are coupled to the sensor interface 78 via a wired connection. However, in other embodiments, the sensors 80 may be coupled to the sensor interface 78 via a wireless connection, such as by using any suitable wireless communications protocol known in the art. As such, the processor(s) 72 may be configured to receive one or more signals from the sensors 80.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 74 may generally include memory element(s) including, but not limited to, computer readable medium (e.g., random access memory (RAM)), computer readable non-volatile medium (e.g., a flash memory), cloud storage, a floppy disk, a compact disc-read only memory (CD-ROM), a magneto-optical disk (MOD), a digital versatile disc (DVD) and/or other suitable memory elements. Such memory device(s) 74 may generally be configured to store suitable computer-readable instructions that, when implemented by the processor(s) 72, configure the controller 70 to perform various functions of the reinforcing assembly 32.

Figure 13:
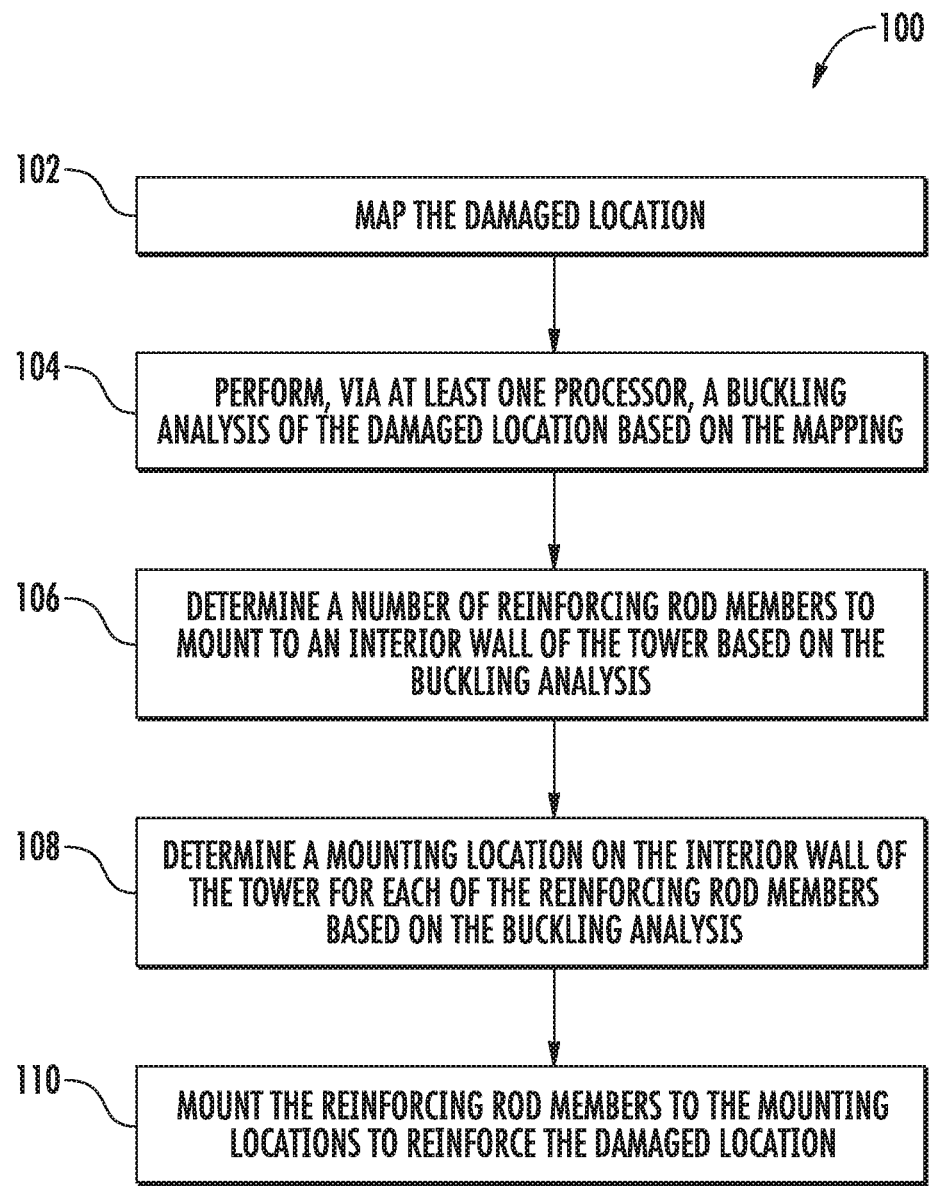
FIG. 13 illustrates a flow diagram of one embodiment of a method for reinforcing a tower of a wind turbine according to the present disclosure.
Figure 14:
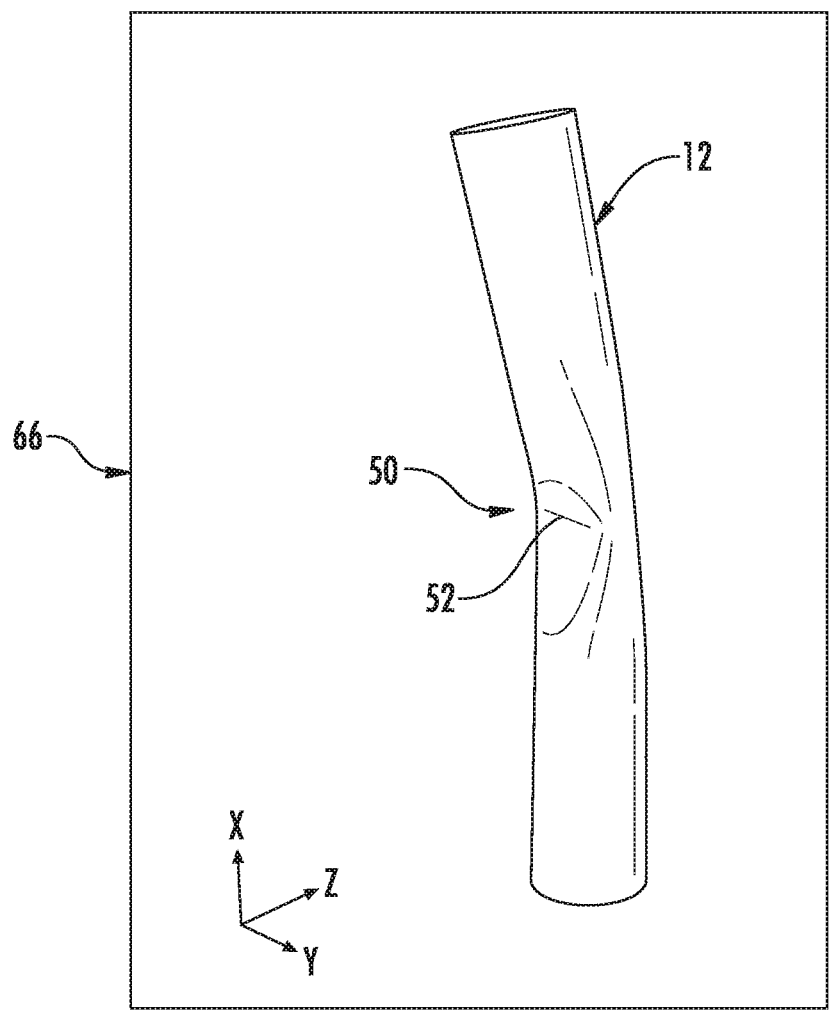
FIG. 14 illustrates a screen shot of one embodiment of a computer model of a tower having a damaged location according to the present disclosure.

Referring now to FIG. 13, a flow diagram of one embodiment of a method 100 for reinforcing a tower 12 of a wind turbine 10 having at least one dent location 52 that may be implemented by the processor 72 is illustrated. As shown at 102, the method 100 includes mapping the dent location 52. Mapping the dent 52 allows a user to further understand the dent location 52, i.e. its shape, location, size, etc. For example, as shown in FIG. 14, the step of mapping the dent location 52 may include generating a computer model 66 of the location to be reinforced 50 that contains the dent 52 using point cloud technology and/or mechanical measurements, e.g. obtained from the sensor(s) 80. As used herein, point cloud technology generally refers to a set of data points in a coordinate system. More specifically, in a three-dimensional coordinate system (as illustrated in FIG. 14), the data points are usually defined by X, Y, and Z coordinates, and often intended to represent the external surface of an object. As such, point clouds may be created by 3D scanners. Thus, such devices measure a large number of points on the surface of the tower 12 and output a point cloud as a data file. The point cloud represents the set of points that the device has measured.

In certain embodiments, the point cloud of the tower 12 may be directly usable or inspected to further analyze the dent 52. For example, in one embodiment, the point cloud of the tower 12 can be aligned to a computer-aided design (CAD) model of the tower 12 and compared to check for differences. These differences can be displayed as color maps that give a visual indicator of the deviation between the point cloud of the tower 12 and the CAD model of the tower 12. Geometric dimensions and tolerances can also be extracted directly from the point cloud.

While the point cloud of the tower 12 can be directly rendered and inspected for dents, the present disclosure also encompasses further analyzing the point cloud to further understand the dent. For example, as shown at 104, the method 100 may include performing, via one or more processor(s) 72, a buckling analysis of the dent location 52 based on the mapping. More specifically, in certain embodiments, the step of performing the buckling analysis of the dent location 52 may include performing a finite element analysis (FEA) of the dent location 52. In addition, the method 100 may include developing one or more transfer functions from the FEA and building a software analysis tool based on the one or more transfer functions. Thus, the software analysis tool may be used for subsequent dents in the tower 12 such that FEA is not required for each new dent.

Referring still to FIG. 14, as shown at 106, the method 100 may further include determining a number of reinforcing rod members 34 to mount to the interior wall 24 of the tower 12 based on the buckling analysis. Further, as shown at 108, the method 100 includes determining a mounting location on the interior wall 24 of the tower 12 for each of the reinforcing rod members 34 based on the buckling analysis. Thus, as shown at 110, the method 100 includes mounting the reinforcing rod members 34 to the mounting locations to reinforce the dent location 52. In additional embodiments, the reinforcing rod members 34 may be mounted to the mounting locations uptower. Alternatively, the reinforcing rod members 34 may be mounted to the mounting locations at a ground level in the field. More specifically, the reinforcing rod members 34 may be welded to the mounting locations via internal brackets or supports with the tower 12 in place. In addition, the reinforcing rod members 34 may be mounted to the mounting locations by drilling holes in the tower 12 with the tower in place and installing bolts from outside of the tower 12.

After installation of the reinforcement assembly 32, the method 100 may also include checking the load capability (i.e. buckling and/or fatigue load limits) of the tower 12 with the assembly 32 in place to ensure that the location(s) to be reinforced is accurately reinforced. More specifically, the step of checking the load capability may include evaluating the load capability of the tower 12 with the assembly 32 in place which includes the load in the assembly 32 to ensure the assembly 32 can meet the load requirements. If the buckling and/or fatigue limits are exceeded, then the geometry of the assembly 32, i.e. the number and/or location of the reinforcing rod members 34 may be adjusted accordingly. If the buckling and/or fatigue limits are not exceeded, the reinforcement assembly 32 can remain installed to support the location to be reinforced 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reinforcing a tower of a wind turbine having at least one damaged location, the method comprising:
   mapping the damaged location;
   performing, via at least one processor, a buckling analysis of the damaged location based on the mapping;
   determining a number of reinforcing rod members to mount to an interior wall of the tower based on the buckling analysis;
   determining a mounting location on the interior wall of the tower for each of the reinforcing rod members based on the buckling analysis;
   arranging the reinforcing rod members into a multi-level configuration comprising a plurality of first reinforcing rod members configured atop a plurality of second reinforcing rod members in a vertical plane; and
   mounting the first and second reinforcing rod members to the mounting locations to reinforce the damaged location.

2. The method of claim 1, wherein mapping the damaged location further comprises generating a computer model of the damaged location using point cloud technology.

3. The method of claim 1, wherein mapping the damaged location further comprises generating a computer model of the damaged location using mechanical measurements.

4. The method of claim 1, wherein performing the buckling analysis of the damaged location further comprises:
   performing a finite element analysis (FEA) of the damaged location;
   developing one or more transfer functions from the FEA; and,
   building a software analysis tool based on the one or more transfer functions.

5. The method of claim 1, further comprising checking a load limit of the tower after mounting the reinforcing rod members to the mounting locations.

6. The method of claim 1, wherein mounting the reinforcing rod members to the mounting locations is completed uptower.

7. The method of claim 1, wherein mounting the reinforcing rod members to the mounting locations to reinforce the damaged location further comprises mounting the reinforcing rod members via an adjustable mounting component configured with ends of the reinforcing rod members.

8. The method of claim 7, wherein the adjustable mounting components comprise at least one of a jacking screw, a jacking foot, a telescoping end, a bracket, a weld, an eyelet screw, or one or more fasteners.

9. The method of claim 7, wherein opposing ends of the reinforcing rod members extend radially from a connector node.

10. The method of claim 1, further comprising coupling together sets of the first and second reinforcing rod members via one or more support structures.

11. The method of claim 1, further comprising coupling the first and second reinforcing rod members to the connector node.

12. The method of claim 1, wherein the multi-level configuration further comprises a plurality of third reinforcing rod members configured atop the plurality of first and second reinforcing rod members in the vertical place, wherein the first, second, and third reinforcing rod members are coupled to the connector node, and wherein the first reinforcing rod members are in compression and the second and third reinforcing rod members are in tension when mounted to the interior wall of the tower.

13. The method of claim 1, wherein the damaged location comprises a dent.

* * * * *